July 24, 1956 — J. J. DELANY — 2,755,672
SEALING UNIT FOR FLUSH VALVE ACTUATOR
Filed Feb. 27, 1953 — 2 Sheets-Sheet 1
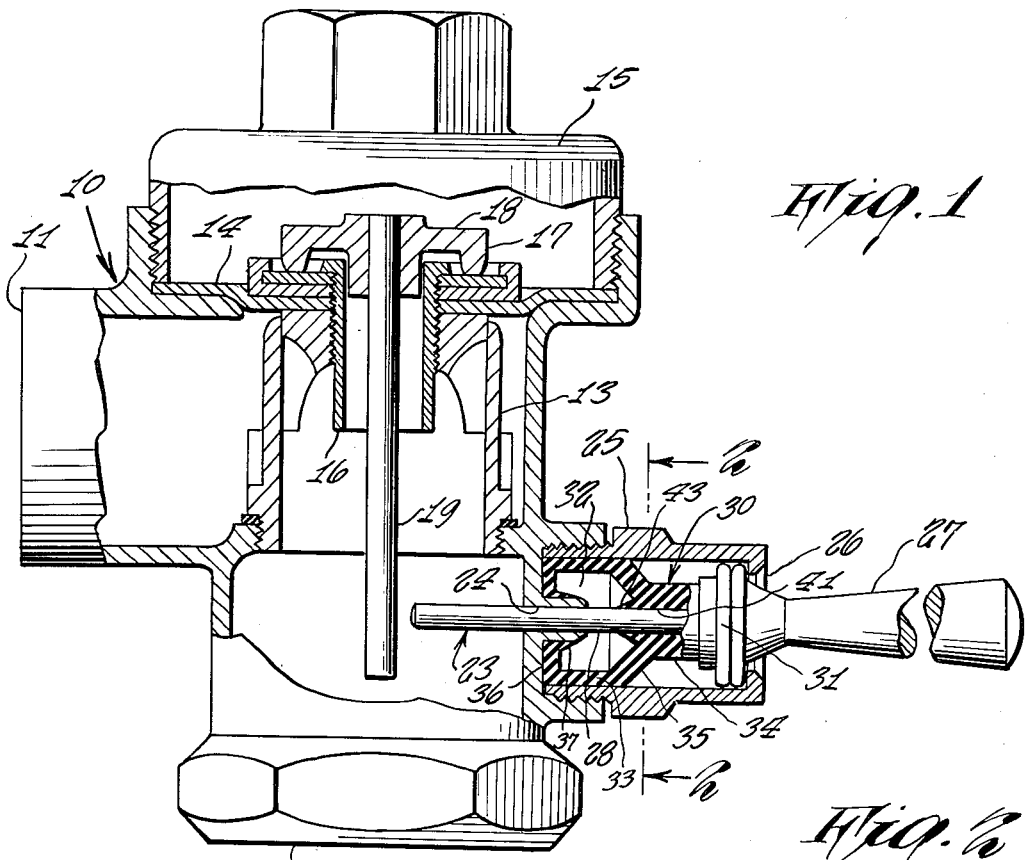
Fig. 1
Fig. 2
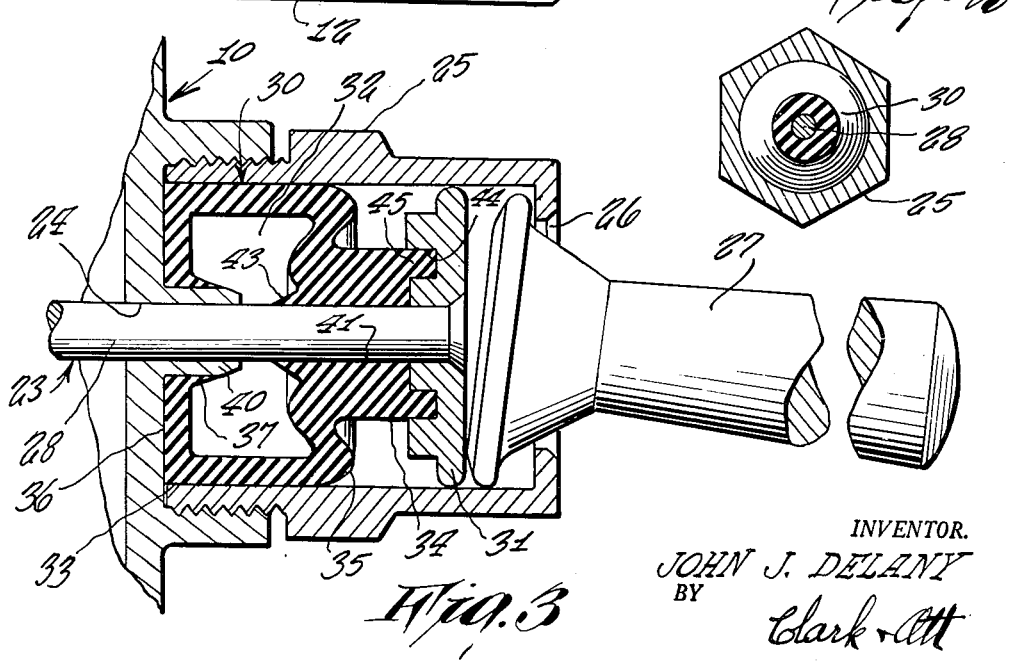
Fig. 3
INVENTOR.
JOHN J. DELANY
BY
Clark + Ott
ATTORNEYS July 24, 1956      J. J. DELANY      2,755,672
SEALING UNIT FOR FLUSH VALVE ACTUATOR
Filed Feb. 27, 1953      2 Sheets-Sheet 2

INVENTOR.
JOHN J. DELANY
BY
Clark & Ott
ATTORNEYS

United States Patent Office 2,755,672
Patented July 24, 1956

2,755,672

SEALING UNIT FOR FLUSH VALVE ACTUATOR

John J. Delany, Brooklyn, N. Y., assignor to Delany Realty Corporation, Brooklyn, N. Y., a corporation of New York Application February 27, 1953, Serial No. 339,239

3 Claims. (Cl. 74—18.2)

This invention relates to a flush valve of the type having an actuator member arranged in a hollow boss on the casing of the valve with the inner end of the actuator member extending through a guide opening in a wall of the valve into adjacent relation with the stem of the valve member and which actuator member is adapted to be actuated for moving the valve to open relation by a handle member disposed in engagement therewith and protruding through an opening in the boss, and the invention is a continuation in part of my co-pending application Serial No. 247,497.

An object of the invention is to provide a sealing unit arranged in surrounding relation with the stem of the actuator member and having sealing engagement at its opposite ends for preventing leakage from the valve through the opening in the boss. In valves of this character, water from the flush valve enters the hollow interior of the sealing unit between the stem of the actuator member and the guide opening in the valve which must be forced back into the body of the flush valve when the handle member is actuated to move the valve element to open relation. Unless adequate sealing means is provided to withstand the pressure of the water within the sealing unit, the water will leak from the opening in the boss when the handle member is moved to actuate the valve.

Another object of the invention is to provide inter-engageable means at the inner end of the boss and sealing unit and interengageable means at the outer end of the actuator member and sealing unit for sealing the ends of the sealing unit.

Still another object of the invention is to provide a sealing unit in which the intermediate portion thereof is deformable with the inward movement of the actuator member to constrict the hollow interior of the sealing unit so as to force the water therein into the body of the valve through the guide opening for the actuator member.

Still another object of the invention is to provide a sealing unit having annular lips against which the pressure of the water in the unit is exerted for impinging the same about the tubular boss through which the actuator member protrudes and against the stem of the actuator member respectively.

With the foregoing and other objects in view, reference is now made to the following specification and accompanying drawings in which the preferred forms of the invention are illustrated.

In the drawings:

Fig. 1 is a side view of a flush valve with parts broken away and shown in section to illustrate the underlying parts and which is provided with a sealing unit for the valve actuator member thereof constructed in accordance with the invention.

Fig. 2 is a sectional view taken approximately on line 2—2 of Fig. 1.

Fig. 3 is an enlarged fragmentary sectional view showing the sealing unit in contracted relation about the actuator member which is forced inwardly by downward movement of the handle member.

Figures 4, 5, 6:
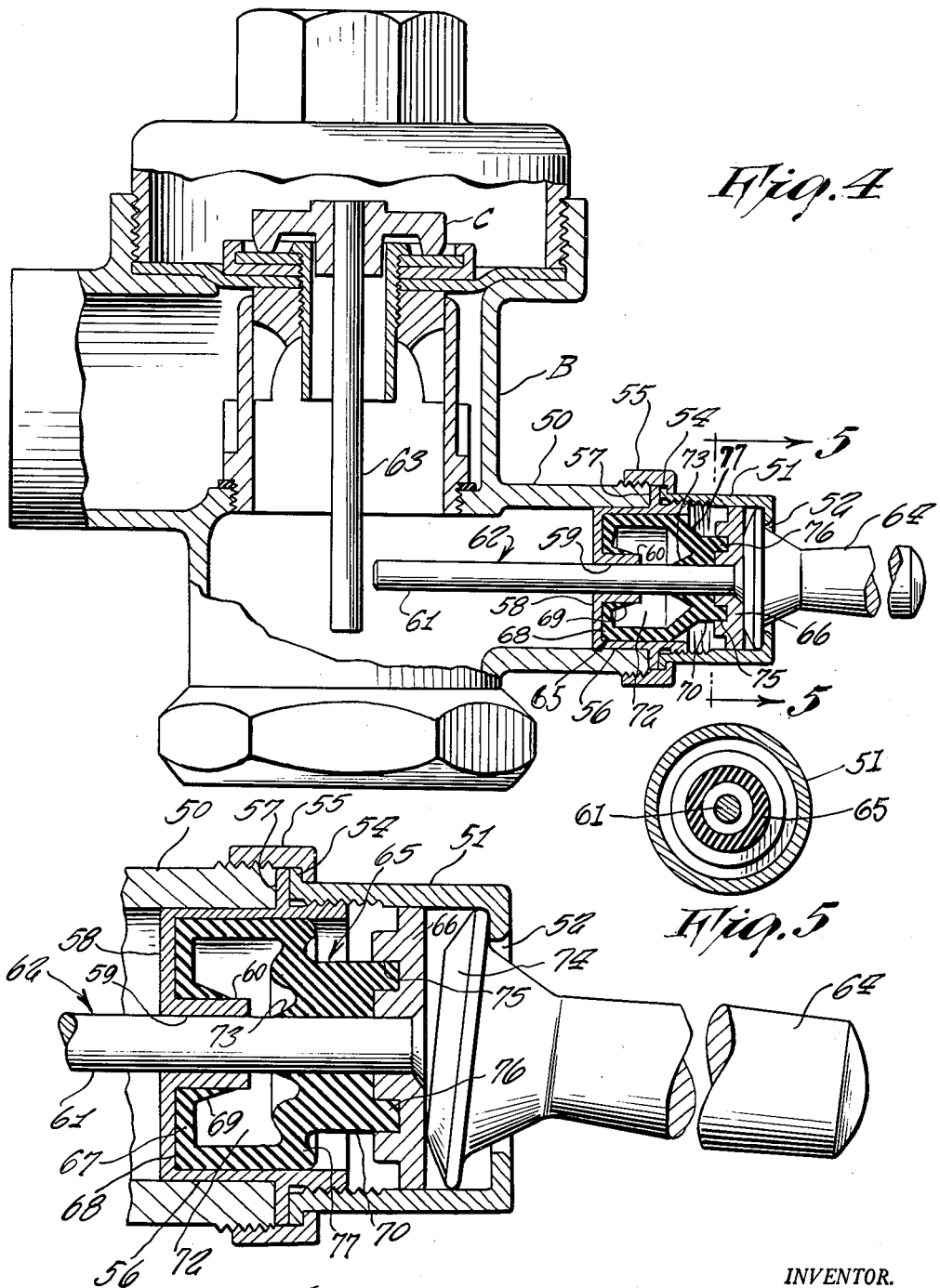
Fig. 4 is a view in elevation of a flush valve embodying a modified form of the invention and illustrating the same with a portion thereof in vertical section.
Fig. 5 is a sectional view taken approximately on line 5—5 of Fig. 4.
Fig. 6 is an enlarged fragmentary sectional view showing the sealing unit in contracted relation about the actuator member which is forced inwardly by downward movement of the handle member.

Referring to the drawings by characters of reference, the flush valve indicated generally by the reference character A includes a casing 10 having inlet and outlet openings 11 and 12 respectively, and intermediate said openings a peripheral wall 13 is threadedly connected with the casing and provides a seat for a diaphragm 14 secured at its periphery between the casing and a cap 15. The diaphragm is centrally apertured to receive a tubular member 16 which is secured thereto at its upper end and extends through the opening in the diaphragm with the free end of the tubular member extending into the peripheral wall 13 in spaced relation thereto. A valve member 17 having a head 18 is normally disposed in seated engagement on the diaphragm in covering relation with the open upper end of said tubular member and is provided with a depending stem 19 adapted to be engaged by an actuator member 23 for tilting the valve member to thereby effect opening of the valve for the flow of water from the inlet 11 downwardly through the peripheral wall 13 and discharge thereof through the outlet 12.

The actuator member 23 protrudes through a guide opening 24 in the wall of the casing 10 with the outer end of the actuator member disposed within a hollow boss 25 threadedly secured at its inner end to the casing 10 and having an opening 26 at its outer end through which protrudes a handle member 27 adapted to be manually tilted for imparting inward movement to the actuator member 23 for effecting opening movement of the valve member 17. The guide opening 24 is of a size to permit free reciprocatory movement of the shank 28 of the actuator member so that when the valve is flushed water in the casing 10 will be forced by the pressure of the water through the opening 24 and into the hollow boss 25. This pressure in many instances is substantial since on the lower floors of large buildings the pressure of the water may be in excess of 75 pounds per square inch in order to provide the required pressure in the water lines at the top of the building.

In order to prevent leakage of water through the opening 26 in the end of the hollow boss 25, a sealing unit 30 is provided which is of tubular formation and is disposed in surrounding relation with the shank 28 of the actuator member 23 and with the inner end thereof constructed to seal the inner end of the hollow boss 25 and the outer end thereof constructed to seal the outer end of the shank 28 of the actuator member. Intermediate the ends thereof, the sealing unit is provided with a cavity 32 which is filled with water flowing into the cavity about the shank 28 through the guide opening 24 when the handle member 27 is released after actuating the flush valve. Inward movement of the actuator member by the manipulation of the handle member 27 to flush the flush valve compresses the sealing unit as shown in Fig. 3 of the drawings so as to expel the water in the cavity 32. Since the ends of the sealing unit 30 are constructed to provide a seal with the inner end of the tubular boss 25 and about the outer end of the shank 28 of the actuator member, the water in the cavity 32 will be forced back into the flush valve through the guide opening 24.

The sealing unit 30 includes an enlarged inner end portion 33, a relatively smaller or reduced outer end portion 34 and a frusto-conical intermediate portion 35. The enlarged inner end portion 33 is formed with an end wall 36 having an inwardly directed annular lip 37 which surrounds a tubular extension 40 formed integrally with the wall of the casing 10 and through which extends the guide opening 24. The said inner end 33 snugly fits the inner end of the hollow boss 25 with the end wall 36 disposed against the wall of the casing within the boss and with the lip 37 snugly fitting and surrounding the tubular extension 40. The outer end 34 of the sealing unit is provided with an axial bore 41 opening into the cavity 32 and opening through the outer end thereof. At the juncture of the outer end portion with the frusto-conical portion 35, the sealing unit is provided with an annular lip 43 which extends inwardly from the outer end portion in surrounding relation with the shank 28 of the actuator member. The head 31 of the actuator member 23 is formed with an annular recess 44 in the inner face thereof in which is snugly fitted an annular flange 45 formed on the outer end of the sealing unit.

Constructed in this manner the annular lip 37 is impinged by the pressure of the water in the cavity 32 annularly about and against the tubular extension 40 and against the inner end of the hollow boss 25 to thereby provide an effective seal at the inner end of the sealing unit. The annular lip 43 is compressed by the pressure of the water in the cavity 32 annularly against the shank 28 and the flange 45 being forced by the pressure of the water into the recess 44 in the head 31 of the actuator member, effectively seals the outer end thereof.

In the form of the invention illustrated in Figs. 4 to 6 inclusive of the drawings, the flush valve indicated generally by the reference character B has an exteriorly threaded hollow boss 50 which opens into the interior of the valve and is closed at its outer end by a cap 51 having a circular opening 52 in the outer end thereof. The cap 51 has an annular flange 54 at its inner end which is engaged by a threaded collar 55 for releasably securing the cap on the boss. In this type of valve a cylindrical cup 56 is fitted within the outer end of the boss 50 and is provided with a peripheral flange 57 adapted to be secured between the end of the boss 50 and the flange 54. The cup 56 is secured to the cap 51 by the threaded outer end thereof engaging the interiorly threaded inner end of the cap. The inner wall 58 of the cup is provided with a central opening 59 in axial alignment with the opening 52 and is formed with a tubular extension 60 projecting into the cup 56 and forming an annular recess with the inner end portion of the cup. The opening 59 extends through the tubular extension 60 and slidably receives the shank 61 of an actuator member 62 with the inner end of the actuator member located adjacent the valve stem 63 of the valve element C for engagement therewith to effect opening of the valve element by inward movement of the actuator member upon manipulation of an operating handle 64.

A sealing unit 65 is arranged in surrounding relation with the shank 61 of the actuator member 62 between the head 66 of the actuator member and the end wall 58 of the cup 56. The sealing unit 65 is similar in construction to the sealing unit 30 and includes an enlarged inner end portion 67 formed with an end wall 68 having an inwardly directed annular lip 69 which surrounds the tubular extension 60 with the end wall 68 disposed against the end wall 58 of the cup. The outer end 70 of the sealing unit is provided with an axial opening 71 which extends into the hollow interior 72 of the sealing unit. An annular lip 73 extends inwardly from the outer end 70 thereof into surrounding relation with the shank 61 of the actuator member. The operating handle 64 in this form of the invention is similar to the operating handle in the previous form and the head 74 thereof is disposed in engagement with the head 66 of the actuator member. The head 66 of the actuator member is provided with an annular recess 75 in its inner face in which is snugly fitted an annular flange 76 on the outer end 70 of the sealing unit.

Constructed in this manner, the annular lip 69 is impinged by the pressure of the water in the hollow interior 72 of the sealing unit annularly about and against the tubular extension 60 and the inner end portion 67 of the sealing unit is compressed into snug fitting engagement with the bottom portion of the cup 56. The annular lip 73 is compressed by the pressure of the water in the hollow interior of the sealing unit against the shank 61, while the annular flange 76 of the sealing unit snugly fits the annular recess 75 in the head 66 of the actuator member so as to effectively seal the opposite ends of the sealing unit.

What is claimed is:

1. A device for sealing the valve actuator member of a flush valve of the type having a handle for moving the actuator member, said device including a casing having a peripheral wall and an apertured outer end wall through which the handle protrudes and having an inner end wall formed with an inwardly projecting tubular sleeve through which the shank of the actuator member protrudes into the flush valve, a hollow resilient sealing unit arranged within said casing and including a peripheral wall and apertured end walls, said sealing unit having its peripheral wall disposed against the peripheral wall of the casing and with the end walls thereof respectively surrounding and fittingly engaging the shank of the valve actuator member and said sleeve and said end walls being compressed against the inner end wall of the casing and the head of the actuator member respectively for sealing the unit against the egress of water, and said outer end wall of the sealing unit being connected with the peripheral wall thereof by a truncated portion which flexes and bends inwardly to compress the peripheral wall thereof against the peripheral wall of the casing when the handle is actuated to move the actuator member inwardly to flush the valve.

2. A device for sealing the valve actuator member of a flush valve of the type having a handle for moving the actuator member, said device including a casing having a peripheral wall and an apertured outer end wall through which the handle protrudes and having an inner end wall formed with an inwardly projecting tubular sleeve through which the shank of the actuator member protrudes into the flush valve, a hollow resilient sealing unit arranged within said casing and including a peripheral wall and apertured end walls having inwardly directed annular lips, said sealing unit having its peripheral wall disposed against the peripheral wall of the casing and with the end walls thereof and said lips respectively surrounding and fittingly engaging the shank of the valve actuator member and said sleeve and said end walls being compressed against the inner end wall of the casing and the head of the actuator member respectively for sealing the unit against the egress of water, and said outer end wall of the sealing unit being connected with the peripheral wall thereof by a frusto-conical portion which flexes and bends inwardly to compress the peripheral wall of the unit against the peripheral wall of the casing when the handle is actuated to move the actuator member inwardly to flush the valve.

3. A device for sealing the valve actuator member of a flush valve of the type having a handle for moving the actuator member, said device including a casing having a peripheral wall and an apertured outer end wall through which the handle protrudes and having an inner end wall formed with an inwardly projecting tubular sleeve through which the shank of the actuator member protrudes into the flush valve, a hollow resilient sealing unit arranged within said casing and including a peripheral wall and apertured end walls having inwardly directed annular lips, said sealing unit having its peripheral wall disposed against the peripheral wall of the casing and with the end walls thereof and said lips respectively surrounding and fittingly engaging the shank of the valve actuator member and said sleeve and said end walls being compressed against the inner end wall of the casing and the head of the actuator member respectively for sealing the unit against the egress of water, and said outer end wall of the sealing unit being connected with the peripheral wall thereof by a flexible portion spaced from the walls of the casing and which is free to flex and bend inwardly to compress the peripheral wall thereof against the peripheral wall of the casing when the handle is actuated to move the actuator member inwardly to flush the valve.

References Cited in the file of this patent

UNITED STATES PATENTS

| | | |
|---|---|---|
| 957,347 | Kennedy | May 10, 1910 |
| 2,506,140 | Delany | May 2, 1950 |

FOREIGN PATENTS

| | | |
|---|---|---|
| 55,603 | Switzerland | Sept. 22, 1910 |
| 519,685 | Germany | Feb. 28, 1930 |